Patented July 27, 1937

2,087,960

UNITED STATES PATENT OFFICE 2,087,960

ARYL MERCURY IMINO AND IMIDO COMPOUNDS AND A PROCESS OF MAKING THEM

Carl N. Andersen, Watertown, Mass., assignor to Lever Brothers Company, a corporation of Maine No Drawing. Application November 22, 1934, Serial No. 754,372

18 Claims. (Cl. 260—13)

The present invention relates to a method of producing certain new organic mercury compounds and to the compounds produced thereby.

It is an object of my invention to produce new organic mercury compounds useful as germicides and for other therapeutic purposes.

More particularly, it is an object of my invention to prepare certain organic mercury compounds which may be regarded as derivatives of imino and imido compounds.

I have discovered that when the essential radical corresponding to certain aromatic mercury compounds is attached to the nitrogen in imino and imido compounds, compounds are produced which have extraordinarily high potency as antiseptics and germicides, and at the same time are characterized by relatively low toxicity and other desirable properties.

The compounds constituting the subject-matter of my invention may be described as having the general formula $(RHg)_x \cdot R_1$, in which R represents an aromatic structure, to a carbon atom of which, preferably a nuclear carbon atom, the mercury is directly attached; in which $x$ represents the number of RHg groups in the compound and is an integer having a value of one or more; and in which $R_1$ represents a radical of an organic compound having an imino or imido group or groups linked to the RHg group through attachment to the nitrogen atom. The compounds will all, therefore, contain one or more of the characteristic groups:

While the word "group" is used herein, it is obvious that it is to be understood as plural where the value of $x$ is more than one.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl, and naphthyl groups.

The expressions "imino compounds" and "imido compound" as used herein are intended to be generic and refer to compounds with one or more imino or imido groups.

The expressions "imino compounds" and "imido compound" are intended to cover all organic nitrogenous compounds in which one H is directly attached to nitrogen. This expression, in addition to secondary amines simple and mixed, is intended to include those compounds in which both of the remaining nitrogen valences are attached to the same atom, such as the aromatic mercury derivative of quinone imine

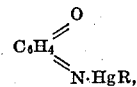

and guanidine

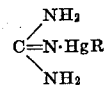

those compounds in which two NHgR groups are linked through a CO group to form the ureid group, for example

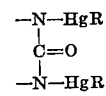

and compounds in which the nitrogen of the NHgR group is part of a ring structure such as phthalimide

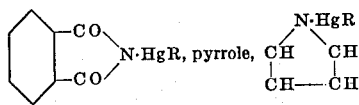

and piperazine

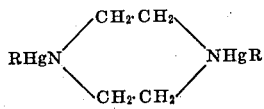

The expressions "imino compounds" and "imido compound" are also intended to include substituted compounds of the type in which the imino or imido hydrogen has been substituted by an atom of another element. Examples are the chloroimides.

I have investigated many imino and imido compounds and have discovered that they may be converted by my novel method into aromatic mercury compounds of the type described. I have prepared a sufficiently large number to lead me to believe that any compound containing an imino or imido group can be converted into aromatic mercury compounds of this type and I, therefore, intend my invention to be generic to and include this entire class. Among the imido compounds whose aromatic mercury derivatives I have prepared are the following: quinone chloroimine, hydrazobenzene, guanidine, ortho benzoic sulphimide, phthalimide, succinimide, pyrrole, naphthalimide, indole, carbazole, isatin, piperidine, 3-nitrophthalimide, glycine anhydride (diketo piperazine), piperazine (diethylene), acridone, pyrrolidine, 1,3-dimethyl xanthine, chloro imino sulpho benzoic acid, emetin, barbituric acid, diethyl barbituric acid, parabanic acid, thiobarbituric acid, xanthine, uric acid, theobromine, di-chlorobarbituric acid, alloxan, allantoin, auramine ("Schultz" #752, "Colour Index" #665), aniline black ("Schultz" #1361, "Colour Index" #870), indigo ("Schultz" #1301, "Colour Index" #1177), indamine blue ("Schultz" #1234, "Colour Index" #1113), indathren red violet ("Schultz" #1260, "Colour Index" #1161), benzo fast orange ("Schultz" #305, "Colour Index" #326), and algol yellow ("Schultz" #1250, "Colour Index" #1138).

The last named compounds are derivatives of dyes which contain an imino or imido group. The above list is representative of the entire class and illustrates that all types of imino and imido compounds are embodied in my invention.

It is well known that amines, including secondary amines or imino compounds, are basic in character and therefore react with acids and acid derivatives. In general, the amines are not regarded as reactive with basic compounds. It has heretofore been proposed to react hydroxymercuric acid anhydrides or salts thereof with imido compounds. In these compounds the hydroxymercuric group is in the ortho position with respect to the carboxylate group. That such a reaction will take place is to be expected because these mercury compounds are acid in character due to the acid groups therein, and because the ortho position of the hydroxymercuric group greatly increases its reactivity to undergo condensations.

I have discovered that aromatic mercury hydroxides of the above mentioned RHg type, which contain no substituted groups in the ring, will react with imino and imido compounds.

A general method of producing my novel mercury compounds consists in reacting together the imino or omido compound and an aromatic mercury hydroxide of the above mentioned type. In certain instances, I may employ analogous aromatic mercury salts, such as the acetate or the chloride.

When the imino or imido compound is unsubstituted, the hydrogen atom therein will be replaced by the aromatic mercury radical. When a substituted imino or imido compound is employed in which the hydrogen has been substituted by another element, it is the atom of this other element which is replaced by the aromatic mercury radical.

The following specific examples are given as illustrative of one advantageous way to practice the process of my invention, as well as to illustrate representative organic mercury derivatives of imino and imido compounds falling within the scope of my invention:

*Example 1*

17.64 grams of phenylmercury hydroxide is dissolved in 4 liters of water by heating to boiling. The solution is then filtered and to the filtrate is added an aqueous solution of 9.70 grams of phthalimide. The mixture is brought to boiling and then allowed to stand for 24 hours. The resulting precipitate is filtered, washed with distilled water and then dried. This product is sparingly soluble in water and melts at 210°–212° C. The compound is phenylmercury phthalimide.

*Example 2*

17.64 grams of phenylmercury hydroxide is dissolved in 4 liters of water. The solution is then filtered and to the filtrate is added an aqueous solution of 3.76 grams of parabanic acid. The mixture is brought to boiling and then allowed to cool and stand for 24 hours. The white precipitate which forms is then filtered, washed well with warm water and dried. This product is sparingly soluble in water and melts above 287° C. The compound is phenylmercury parabanate.

*Example 3*

17.64 grams of phenylmercury hydroxide is dissolved in 4 liters of water and heated until solution is complete. The solution is then filtered to remove any gum or undissolved material. To the filtrate is added 4.75 grams of thiobarbituric acid dissolved in 400 cc. of water. A precipitate results and the mass is allowed to stand until cool, when it is filtered, washed with warm water and dried. The precipitate does not melt at 250° C. The compound is phenylmercury thiobarbiturate.

*Example 4*

17.64 grams of phenylmercury hydroxide is dissolved in 4 liters of water and heated until solution is complete. The mixture is then filtered to remove any insoluble material. To this filtrate is added 6.54 grams of succinimide dissolved in 200 cc. of water. No precipitate forms when the succinimide is added to the phenylmercury hydroxide in boiling solution. Turbidity and a precipitate, however, results on cooling. The precipitate is separated by filtration, washed and dried. It melts at 187–188° C. The compound is phenylmercury succinimide.

*Example 5*

17.64 grams of phenylmercury hydroxide is dissolved in 4 liters of water and heated until solution is complete. The solution is filtered to remove any insoluble material. To the filtrate is added 11.82 grams of 5,5 di-chlorobarbituric acid dissolved in 50 cc. of alcohol. A white curdy precipitate results. The mixture is allowed to cool, after which it is filtered, and the precipitate washed well with warm water and dried. It has a melting point of 240–243° C. with decomposition. The compound is phenylmercury 5,5 di-chlorobarbiturate.

*Example 6*

17.64 grams of phenylmercury hydroxide is dissolved in 4 liters of water and heated until solution is complete. The solution is filtered to remove any insoluble material. To the filtrate is added 9.70 grams of indole dissolved in 100 cc. of alcohol. A white precipitate results. The mixture is set aside to cool, after which it is filtered, and the precipitate washed well with warm water and 50 cc. of alcohol, and dried. It has a melting point of 155–156° C. The compound is phenylmercury indole.

*Example 7*

17.64 grams of phenylmercury hydroxide is dissolved in 2 liters of water and heated until solution is complete. The solution is filtered to remove any insoluble material. To the filtrate is added 5.52 grams of hydrozobenzene dissolved in 400 cc. of alcohol. A light yellow precipitate results. The mixture is allowed to cool, after which it is filtered, and the precipitate washed well with warm water and alcohol and dried. The resulting precipitate is a brownish crystalline material which melts at 118°–120° C. The compound is phenylmercury hydrazobenzene.

*Example 8*

17.64 grams of phenylmercury hydroxide is dissolved in 2 liters of water and heated until solution is complete. The solution is filtered to remove any insoluble material. To the filtrate is added 200 cc. of aqueous solution containing 6.18 grams of guanidine carbonate which has been neutralized with 2.4 grams of sodium hydroxide to liberate guanidine. The solution remains clear and is concentrated to one-third of its original volume. White crystals separate. Upon re-crystallization from water their melting point is 152° C. If heated further a gas is evolved at 157° C., and the material does not discolor. If the heating is continued, the material becomes solid at 219° C. and a gas is liberated, and melts again at 250° C. The above behavior indicates that the first named compound, namely, the one melting at 152° C., is in all probability a hydrated phenylmercury guanidine. The number of waters of crystallization has not been determined. At 157° C. this material apparently loses water of crystallization. After this water of crystallization has been expelled, a solid anhydrous salt remains which melts at 250° C. The gas expelled during heating is in all probability water vapor. When the material is crystallized from alcohol, the anhydrous compound is formed direct, and does not melt at 260° C.

If a similar procedure is employed with phenylmercury hydroxide and guanidine carbonate unneutralized, the product which results from recrystallization from alcohol melts at 172° C. and upon continuing the heating it solidifies and melts again between 200° and 205° C.

The following examples illustrate methods of preparing my novel compounds by employing a substituted imine. In this reaction the aromatic mercury radical replaces the substituted atom.

*Example 9*

20.16 grams of phenylmercury acetate is dissolved in 4 liters of water and heated until solution is complete. The solution is filtered to remove any insoluble material. To the filtrate is added 8.46 grams of para quinone chloroimine. A precipitate results and the mixture is allowed to stand until cool. The precipitate is removed by filtration, washed well with warm water and dried. The product decomposes without melting at 289° C. The compound is phenylmercury para quinone imine.

*Example 10*

3.12 grams of phenylmercury chloride is dissolved in 8 liters of 95% alcohol. The application of heat is desirable due to the difficulty with which the compound dissolves. To the solution is added 2.17 grams of chloro imino sulfo benzoic acid dissolved in alcohol. When solution is complete, 3 grams of small crystals of sodium iodide are added. Iodine is set free, indicating that a reaction has taken place.

The mixture is concentrated to 80% its original volume and allowed to stand overnight. White glistening crystals separate on the surface which do not melt at 360° C. On further evaporation, a yellowish-brown product separates which after washing well with water and drying does not melt at 360° C. In addition to the two organic compounds mentioned above, sodium chloride also separates out as the resulting product from the condensation.

In the above example I have been unable to definitely identify the structure of the resulting compound. From a theoretical consideration it would appear that the compound should have the same structure as the phenylmercury compound prepared from ortho benzoic sulphinide. However, the properties of the two compounds differ slightly. I believe that the compound produced in the previous example, however, is an aromatic mercury imide and falls within the general group of compounds comprising my invention.

When an aromatic hydroxide is employed to react with the imino or imido compound, the only other product of the reaction in each instance is water. This is an advantage from the standpoint of producing a pure product without having to use involved purifying steps. When a salt is employed, the corresponding acid is also formed, but this is unobjectionable in most instances.

All the other compounds of this group may be similarly treated with an aromatic mercury hydroxide to form the corresponding aromatic mercury imino or imido derivative. From the specific examples given it will be obvious to one skilled in the art what procedure is to be followed in producing these other compounds. Theoretical quantities are employed. In some cases, particularly where the imino or imido compound is water-soluble, I may employ approximately 10% excess of the imino or imido compound in order to insure the complete conversion of the aromatic mercury compound.

The operativeness of the process is not found to depend in any degree upon the temperature at which the reaction is effected. It is convenient to use heat because it facilitates the solution of the reacting component and speeds the reaction, but the process can be carried out at any temperature, for example, room temperature. Similarly, the process may be carried out in any mutual solvent. Water is usually employed for reasons of convenience if the reacting components are water soluble, but if not, other solvents such as the alcohols, acetone, or mixtures of these with each other or with water may be used.

All of the compounds produced as above described are characterized by extraordinarily high potency as germicides. Tests to determine their efficiency in killing *B. Typhosus* and *Staph. aureus* were carried on under the following conditions:

Aqueous solutions of varying dilutions from 1:10,000 upward until killing ceased, were made up. These dilutions were employed in the conduct of the tests by the following methods:

Circular 198, U. S. Dept. of Agriculture, Dec. 1931, described as F. D. A. method against *Eber-*

*thella typhi* (typhoid bacillus) at 37° C. and F. D. A. special method against *Staph. aureus* at 37° C.

As illustrative of the potency of the compounds, the killing power of the following compounds is given merely as illustrative.

The figures represent the maximum dilutions at which killing in 15 minutes resulted:

|  | B. typhosus | Staph. aureus |
|---|---|---|
| Phenylmercury phthalimide | 1:100,000 | 1:30,000 |
| Phenylmercury 3-nitrophthalimide | 1:80,000 | 1:60,000 |
| Phenylmercury ortho benzoic sulphinide | 1:60,000 | 1:30,000 |
| (recrystallized) | 1:40,000 | 1:25,000 |
| Phenylmercury succinimide | 1:70,000 | 1:40,000 |
| Phenylmercurynaphthalimide (in alcohol) | 1:100,000 | 1:35,000 |
| Phenylmercury carbazole | 1:52,500 | 1:45,000 |
| Phenylmercury glycine anhydride (diketo piperazine) | 1:80,000 | 1:70,000 |
| Phenylmercury pyrrole | 1:70,000 | 1:45,000 |
| (in alcohol) | 1:80,000 | 1:45,000 |
| Phenylmercury indole | 1:60,000 | 1:45,000 |

These compounds are further characterized by particularly desirable properties from the standpoint of relative freedom from toxicity and their adaptability for various germicidal and therapeutic uses. Tests made with some of them indicate that they are not only especially well suited for use as a germicide but that at least some of them may be used in medicine, for example, as a hypnotic or sedative, and may be administered internally, intravenously or peritoneally with excellent results.

All of these compounds retain a high germicidal value when incorporated in soaps or mixed in various menstruums in forming antiseptic and germicidal compositions.

These new compounds may be used directly as germicides in aqueous or other solutions or may be formed into various preparations such as mouth washes, tooth pastes, soaps, ointments, etc.

This application is a continuation in part of my earlier filed application, Serial No. 694,203, filed October 18, 1933.

I claim:

1. The method of preparing organic mercury compounds which comprises reacting an organic compound containing an =NH group with an aromatic mercury hydroxide in which the mercury is directly connected to a carbon atom of an aromatic structure and in which none of the carbon atoms has direct linkage with any element other than hydrogen, carbon or mercury, whereby the aromatic mercury radical becomes attached to the nitrogen atom in the =NH group.

2. The method of preparing organic mercury compounds which comprises reacting an organic compound containing an =NH group with an aromatic mercury hydroxide in which the mercury attached to a carbon atom of an aromatic structure and in which none of the carbon atoms has direct linkage with any element other than hydrogen, carbon and mercury, whereby the hydrogen of the =NH group is replaced by the aromatic mercury radical.

3. The method of preparing organic mercury compounds which comprises reacting an organic compound containing an =NH group with the compound $C_6H_5HgOH$.

4. The method of preparing organic mercury compounds which comprises reacting in an aqueous solution an organic compound containing an =NH group with an aromatic mercury hydroxide in which mercury is attached to a carbon atom of an aromatic structure and in which none of the carbon atoms has direct linkage with any element other than hydrogen, carbon and mercury, whereby the hydrogen of the =NH group is replaced by the aromatic mercury radical.

5. The method of preparing organic mercury compounds which comprises reacting in an aqueous solution an organic compound containing an =NH group with the compound $C_6H_5HgOH$.

6. The method of preparing organic mercury compounds which comprises reacting in an aqueous solution an imino compound in which the imino nitrogen is attached to only one carbon atom with an aromatic mercury hydroxide in which mercury is attached to a carbon atom of an aromatic structure and in which none of the carbon atoms has direct linkage with any element other than hydrogen, carbon, and mercury.

7. The method of preparing organic mercury compounds which comprises reacting in an aqueous solution an imino compound in which the imino nitrogen is attached to only one carbon atom and the compound $C_6H_5HgOH$.

8. The method of preparing an organic mercury compound which comprises reacting in an aqueous solution the compound $C_6H_5HgOH$ and guanidine.

9. The method of preparing an organic mercury compound which comprises reacting in an aqueous solution the compound $C_6H_5HgOH$ and hydrazobenzene.

10. A new organic mercury compound of the general formula $(RHg)_x \cdot R_1$, in which R represents an aromatic structure in which none of the carbon atoms has direct linkage with any element other than hydrogen, carbon and mercury; in which $R_1$ represents a radical of an organic compound containing an =NH group, the nitrogen of which is attached to an RHg group; and in which $x$ represents the number of RHg groups and is an integer having a value of at least one and not more than the number of =NH groups in the compound of which $R_1$ is the radical.

11. A new organic mercury compound of the general formula $RHg \cdot R_1$ in which R represents an aromatic structure in which none of the carbon atoms has direct linkage with any element other than hydrogen, carbon and mercury; and in which $R_1$ represents a radical of an organic compound containing one =NH group, the nitrogen atom of which is attached to the RHg group.

12. A new organic mercury compound of the general formula

$$R_1 > N\!-\!HgR$$

in which R represents an aromatic structure in which none of the carbon atoms has direct linkage with any element other than hydrogen, carbon and mercury; and $R_1$ represents an organic radical in which two valences of the same carbon atom are attached to and satisfied by the nitrogen.

13. A new organic mercury compound of the general formula $(C_6H_5Hg)_x \cdot R_1$, in which $R_1$ represents a radical of an organic compound containing an =NH group, the nitrogen of which is attached to a $C_6H_5Hg$ group; and in which $x$ represents the number of $C_6H_5Hg$ groups and is an integer having a value of at least one and not more than the number of =NH groups in the compound of which $R_1$ is the radical.

14. A new organic mercury compound of the general formula $C_6H_5Hg \cdot R_1$, in which $R_1$ represents a radical of an organic compound containing one =NH group, the nitrogen atom of which is attached to the C₆H₅Hg group.

15. A new organic mercury compound of the general formula $$R_1 > N-HgC_6H_5$$

in which R₁ represents an organic radical in which two valences of the same atom are attached to and satisfied by the nitrogen.

16. Phenylmercury quinone imine.
17. Phenylmercury hydrazobenzene.
18. Phenylmercury guanidine.

CARL N. ANDERSEN.